(12) United States Patent
Moein (10) Patent No.: US 12,533,227 B2
(45) Date of Patent: Jan. 27, 2026

(54) PLUNGER FOR AN INJECTOR, AND INJECTOR

(71) Applicant: Carl Zeiss Meditec AG, Jena (DE)

(72) Inventor: Hadi Moein, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 499 days.

(21) Appl. No.: 18/126,428

(22) Filed: Mar. 25, 2023

(65) Prior Publication Data

US 2023/0225856 A1 Jul. 20, 2023

Related U.S. Application Data

(63) Continuation of application No. PCT/EP2021/074650, filed on Sep. 8, 2021.

(30) Foreign Application Priority Data

Sep. 25, 2020 (DE) ...................... 10 2020 125 130.0

(51) Int. Cl.
*A61F 2/16* (2006.01)

(52) U.S. Cl.
CPC ..................................... *A61F 2/167* (2013.01)

(58) Field of Classification Search
CPC ................................ A61F 2/167; A61F 2/1672
See application file for complete search history.

(56) References Cited

U.S. PATENT DOCUMENTS

| 2,717,599 A | | 9/1955 | Huber et al. |
| 5,772,666 A | * | 6/1998 | Feingold ............... A61F 2/1678 606/107 |
| 6,162,229 A | * | 12/2000 | Feingold ................. A61F 2/167 606/107 |

(Continued)

FOREIGN PATENT DOCUMENTS

| DE | 69635279 T2 | 7/2006 |
| EP | 3494927 A1 | 6/2019 |

(Continued)

OTHER PUBLICATIONS

International Search Report dated Feb. 8, 2022, of international application PCT/EP2021/074650 on which this application is based, and English Language translation thereof.

(Continued)

*Primary Examiner* — Sarah W Aleman
(74) *Attorney, Agent, or Firm* — Ewers IP Law PLLC; Falk Ewers (57) ABSTRACT

A plunger for an injector to inject an intraocular lens into the capsular bag of an eye has a deformable cushion and a contact surface with a cutout in which an imaginary reference point is arranged. The plunger has two points groups, each having a design point arranged on an outer contour, an inner contour point arranged on an inner contour, and a reference point. For each of the point groups, the distance from the design point to a circle or a closed curve is equal to the distance from the inner contour point to the reference point, the design point, the inner contour point and the reference point lie on a straight line, and the inner contour point lines between the design point and the reference point. The distance from the inner contour point to the reference point is different for at least two of the point groups.

10 Claims, 4 Drawing Sheets

(56) References Cited

U.S. PATENT DOCUMENTS

| | | | | |
|---|---|---|---|---|
| 6,976,989 | B1* | 12/2005 | Vincent | A61F 2/167 |
| | | | | 606/107 |
| 7,037,328 | B2* | 5/2006 | Vincent | A61F 2/167 |
| | | | | 606/107 |
| 9,226,819 | B2* | 1/2016 | Downer | A61F 2/167 |
| 11,045,310 | B2* | 6/2021 | Glick | A61F 2/1678 |
| 2001/0007075 | A1* | 7/2001 | Hjertman | A61F 2/1667 |
| | | | | 606/107 |
| 2003/0216745 | A1* | 11/2003 | Brady | A61F 2/1678 |
| | | | | 606/103 |
| 2007/0005135 | A1* | 1/2007 | Makker | A61F 2/167 |
| | | | | 623/6.12 |
| 2009/0216244 | A1* | 8/2009 | Pynson | A61F 2/1672 |
| | | | | 606/107 |
| 2014/0257316 | A1 | 9/2014 | Safabash et al. | |
| 2022/0192818 | A1* | 6/2022 | Raquet | A61F 2/167 |

FOREIGN PATENT DOCUMENTS

| | | | |
|---|---|---|---|
| WO | 9205816 | A1 | 4/1992 |
| WO | 9715253 | A1 | 5/1997 |

OTHER PUBLICATIONS

Office Action issued in German Patent Application No. DE 10 2020 125 130.0 (from which this application claims priority), dated May 21, 2021, and English Language translation thereof.

* cited by examiner

PLUNGER FOR AN INJECTOR, AND INJECTOR

CROSS REFERENCE TO RELATED APPLICATIONS

This application is a continuation application of international patent application PCT/EP2021/074650, filed Sep. 8, 2021, designating the United States and claiming priority from German application DE 10 2020 125 130.0, filed Sep. 25, 2020, and the entire content of these applications is incorporated herein by reference.

TECHNICAL FIELD

The disclosure relates to a plunger for an injector for inserting an intraocular lens into the capsular bag of an eye, and to the injector having the plunger.

BACKGROUND

In cataract treatment of an eye, only a small incision is usually made in the cornea of the eye, said incision being large enough to allow a tip of an injector to be inserted into the eye through the incision. After the incision has been made in the cornea, the lens of the eye is broken up, e.g., by phacoemulsification, and then aspirated from the capsular bag of the eye. An intraocular lens is then inserted into the eye. In the process, the intraocular lens is folded such that it fits through the tip of the injector. The tip is inserted into the capsular bag through the incision, and the folded intraocular lens is pushed by a plunger of the injector through the tip into the capsular bag, in which the intraocular lens unfolds and thus replaces the original lens. When the plunger is pushed into the tip, it is squeezed, as a result of which the cross section of the longitudinal end of the plunger is reduced. However, a disadvantage of this is that the tip and the plunger are under mechanical stress here. This can lead to the plunger and/or the tip being damaged.

DE 696 35 279 T2 describes an injection device with a deformable plunger tip for a deformable intraocular lens.

SUMMARY

An object of the disclosure is therefore to provide an injector having a plunger for inserting an intraocular lens into the capsular bag of an eye, in which there is little possibility of damaging the plunger and/or a tip of the injector.

The first injector according to an aspect of the disclosure, which is configured to inject an intraocular lens into the capsular bag of an eye, has: a tip, and a plunger having a deformable cushion which has an unsqueezed state and a squeezed state and, at one longitudinal end of the plunger, has a contact surface into which a recess is introduced, wherein in the unsqueezed state the contact surface has an outer contour externally delimiting the contact surface and has an inner contour externally delimiting the recess, wherein an imaginary reference point is arranged in the recess, which reference point is the center point of an imaginary circle arranged in the plane of the contact surface, wherein the plunger has at least two groups of points, which each have a design point, arranged on the outer contour, an inner contour point, arranged on the inner contour, and the reference point, it being the case for each of the groups of points that the distance from the design point to the circle is the same length as the distance from the inner contour point to the reference point, that the design point, the inner contour point and the reference point lie on a straight line, and that the inner contour point lies between the design point and the reference point, wherein the distance from the inner contour point to the reference point is different for at least two of the groups of points, wherein the plunger is mounted in the injector in such a way as to be displaceable longitudinally in a direction of displacement and is configured to be moved, with the contact surface to the front, into the tip, wherein the reference point is chosen such that, when the reference point is projected in the direction of displacement, the reference point coincides with the center of gravity of a first internal cross section of the tip, of which the normal is parallel to the direction of displacement.

The second injector according to an aspect of the disclosure, which is configured to inject an intraocular lens into the capsular bag of an eye, has: a tip, and a plunger having a deformable cushion which has an unsqueezed state and a squeezed state and, at one longitudinal end of the plunger, has a contact surface into which a recess is introduced, wherein in the unsqueezed state the contact surface has an outer contour externally delimiting the contact surface and has an inner contour externally delimiting the recess, wherein an imaginary reference point is arranged in the recess, which reference point is the center point of an imaginary closed curve arranged in the plane of the contact surface, wherein the plunger has at least two groups of points, which each have a design point, arranged on the outer contour, an inner contour point, arranged on the inner contour, and the reference point, it being the case for each of the groups of points that the distance from the design point to the closed curve is the same length as the distance from the inner contour point to the reference point, that the design point, the inner contour point and the reference point lie on a straight line, and that the inner contour point lies between the design point and the reference point, wherein the distance from the inner contour point to the reference point is different for at least two of the groups of points, wherein the plunger is mounted in the injector in such a way as to be displaceable longitudinally in a direction of displacement and is configured to be moved, with the contact surface to the front, into the tip, wherein the closed curve in its interior delimits a surface which has the same shape as a second internal cross section of the tip at the narrowest point thereof, wherein the normal of the second internal cross section is parallel to the direction of displacement. The center point is the center of gravity of the surface area delimited by the closed curve in its interior.

During operation of the injector, the plunger is to be moved toward the tip from a site outside the tip. When the plunger is moved toward the tip, the cushion is initially in the unsqueezed state. The contact surface makes contact with the intraocular lens and pushes the intraocular lens toward the tip. As the plunger enters the tip during a forward movement, it is squeezed, and the cushion thereby adopts a partially squeezed state. In the process, the shape of the contact surface changes, and the volume of the recess becomes smaller as the forward movement increases. Since the volume of the recess becomes smaller, mechanical stresses both in the plunger and in the tip can be reduced, as a result of which any possibility of the plunger and the tip being damaged can be reduced. Since the inner contour is designed according to the disclosure, a spatial distribution of the mechanical stresses in the cushion and in the tip surrounding the cushion can be evened out. In this way, local maxima of the mechanical stresses can be reduced, as a result of which the possibility of the cushion and the tip being damaged is particularly low. If the contact surface is moved as far as an opening of the tip at which the intraocular lens leaves the injector, the cushion cannot be squeezed any further, and the cushion is in the squeezed state. It is conceivable that, in the region of the contact surface, the cushion in the squeezed state has substantially the shape of the circle or of the closed curve on the outside.

It is typical that the plunger has at least three of the groups of points. As a result, the spatial distribution of the mechanical stresses in the cushion can be made particularly uniform. It is particularly typical that the distance from the inner contour point to the reference point is different for at least three of the groups of points. As a result, the spatial distribution of the mechanical stresses can be evened out even more.

The outer contour typically has a shape different from a circle. It is also conceivable that the inner contour has a shape different from a circle. It is typical that the inner contour is an interpolation of the inner contour points. The interpolation can, for example, have a spline or a line. The spline or the line can connect two adjacent inner contour points to each other.

It is typical that the circle 8 has a diameter of 1.4 mm to 3.0 mm. It is moreover typical that two points arranged on the outer contour 7 have a maximum spacing of 4.0 mm, in particular 3.5 mm. It is the condition here that the diameter of the circle and the shape of the outer contour in the unsqueezed state are to be chosen such that the circle lies completely within the outer contour. It is moreover conceivable that two adjacent outer contour points have an angular distance of at most 120°.

The cushion typically has a widening portion, of which the cross section widens in the direction of the contact surface. As a result, the cushion has a smaller volume than if the cushion had the thickness of the outer contour along the length of the widening region. As a result, mechanical stresses in the cushion and in the tip can be reduced when the cushion is squeezed. It is particularly typical that the recess extends in the widening portion and tapers in the widening portion in a direction away from the contact surface. It is thereby possible to keep a thickness of the cushion constant in a longitudinal direction of the plunger.

It is typical that the cushion has a protruding portion which, transverse to a direction parallel to the normal of the contact surface, protrudes from the rest of the cushion and forms the contact surface.

For the second injector according to an aspect of the disclosure, it is typical that the reference point is chosen such that, when the reference point is projected in the direction of displacement, the reference point coincides with the center of gravity of a first internal cross section of the tip, of which the normal is parallel to the direction of displacement. This ensures that the cushion is squeezed as uniformly as possible along its circumference when it is pushed into the tip. In this way, the distribution of the mechanical stresses can be particularly evened out.

The circle typically has the same diameter as a second internal cross section of the tip at the narrowest point thereof, wherein the normal of the second internal cross section is parallel to the direction of displacement. According to an aspect of the disclosure, the closed curve delimits in its interior a surface area which has the same shape as a second internal cross section of the tip at the narrowest point thereof, wherein the normal of the second internal cross section is parallel to the direction of displacement. It is conceivable here that the first internal cross section and the second internal cross section coincide. It is moreover conceivable that the first internal cross section and the second internal cross section are arranged at the opening of the tip.

BRIEF DESCRIPTION OF THE DRAWINGS

The disclosure will now be described with reference to the drawings wherein.

DESCRIPTION OF EXEMPLARY EMBODIMENTS

As can be seen from FIGS. 1 to 5, a plunger 1 for an injector 17, which is configured to inject an intraocular lens 22 into the capsular bag of an eye, has a deformable cushion 2, which can adopt an unsqueezed state and a squeezed state. At one longitudinal end of the plunger 1, the cushion 2 has a contact surface 15, into which a recess 6 is introduced, wherein, in the unsqueezed state, the contact surface 15 has an outer contour 7 externally delimiting the contact surface 15 and an inner contour 10 externally delimiting the recess 6. An imaginary reference point 9 is arranged in the recess 6 and is the center point of an imaginary circle 8 or another closed curve arranged in the plane of the contact surface 15, the plunger 1 having at least two groups of points. The groups of points each have a design point 11, arranged on the outer contour 7, an inner contour point 13, arranged on the inner contour 10, and the reference point 9, it being the case for each of the groups of points that the distance 12 from the design point 11 to the circle 8 or the closed curve is the same length as the distance 14 from the inner contour point 13 to the reference point 9. It is also the case for each of the groups of points that the design point 11, the inner contour point 13 and the reference point 9 lie on a straight line, and that the inner contour point 13 lies between the design point 11 and the reference point 9, with the distance 14 from the inner contour point 13 to the reference point 9 being different for at least two of the groups of points. In the case where the closed curve is provided, the center point is the center of gravity of the surface area delimited by the closed curve in its interior.

Figure 1:
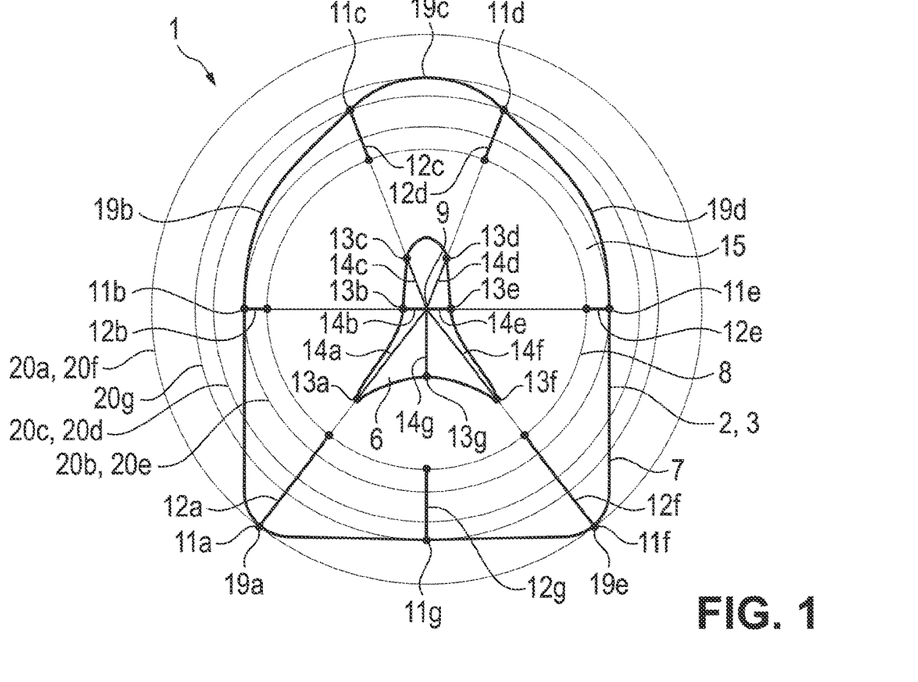
FIG. 1 shows a plan view of a plunger according to a first exemplary embodiment of the disclosure.
Figure 2:
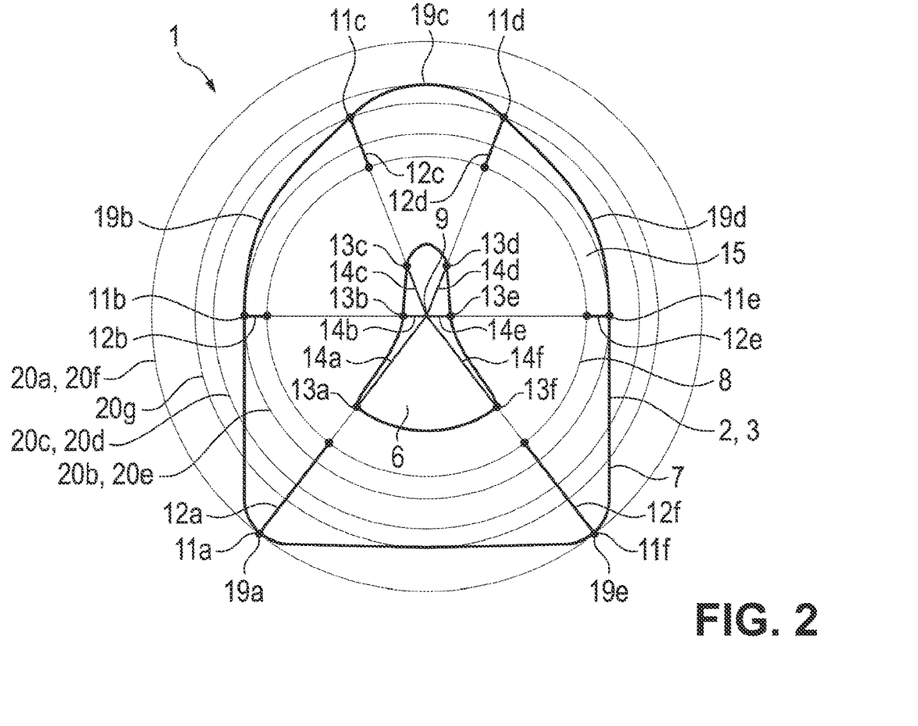
FIG. 2 shows a plan view of the plunger according to a second exemplary embodiment of the disclosure.

FIGS. 1 and 2 show several groups of points, which are each provided with the suffix "a", "b", "c", "d", "e", "f" or "g". The first group of points has a design point 11a. If a direct straight line is drawn between the design point 11a and the reference point 9, a path with a distance 12a results between the design point 11a and the circle 8 or the closed curve. This distance 12a is applied, starting from the reference point 9, in the direction of the design point 11a, thereby resulting in the inner contour point 13a. The path length between the reference point 9 and the inner contour point 13a is denoted by 14a and thus has the same value as the distance 12a.

The second group of points has the design point 11b and inner contour point 13b, the distance between the design point 11b and the circle 8 or the closed curve being denoted by 12b. This distance 12b has the same value as the distance 14b, which is present between the reference point 9 and the inner contour point 13b. The third group of points has the design point 11c and the inner contour point 13c, to which the distances 12c and 14c belong. The fourth group of points has the design point 11d and the inner contour point 13d, to which the distances 12d and 14d belong. The fifth group of points has the design point 11e and the inner contour point 13e, with the distances 12e and 14e. The sixth group of points has the design point 11f and the inner contour point 13f, with the distances 12f and 14f. The seventh group of points has the design point 11g and the inner contour point 13g, with the distances 12g and 14g.

FIGS. 1 and 2 also show that, when the cushion 2 is in the unsqueezed state, the circle 8 or the closed curve can be arranged completely within the outer contour 7. Moreover, for each of the groups of points in FIGS. 1 and 2, a circle 20 is drawn whose center point is the reference point 9 and which runs through the respective design point 11 of the respective group of points. Accordingly, a first circle 20a is drawn for the first group of points, and a second circle 20b is drawn for the second group of points. A circle 20c is drawn for the third group of points, a circle 20d for the fourth group of points, a circle 20e for the fifth group of points, a circle 20f for the sixth group of points, and a circle 20g for the seventh group of points.

FIGS. 1 to 5 show that the outer contour 7 can have a shape different from a circle. Moreover, the inner contour 10 can also have a shape different from a circle. In particular, FIGS. 1 and 2 show that the contact surface 15 can have the shape of a pentagon, for example. Four corners 19a, 19b, 19d, and 19e of the five corners 19a to 19e can be arranged in the corners of an imaginary rectangle here. The fifth corner 19c can lie on a straight line which intersects two parallel sides of the rectangle at the center points thereof. It is moreover conceivable that the corners 19a to 19e are rounded, as is also shown in particular in FIGS. 1 and 2. Since the corners 19a to 19e are rounded, sliding of the plunger 1 in the injector 17 is made easier. At least some of the design points 11 can be arranged in at least some of the corners 19. FIGS. 1 and 2 also show that the design points 11 can be arranged symmetrically with respect to a mirror axis of the contact surface 15.

FIGS. 1 and 2 show that the plunger 1 can have at least three of the groups of points. A third one of the groups of points has a third design point 11c, a third inner contour point 13c and the reference point 9. It is moreover conceivable that the distance 14 from the inner contour point 13 to the reference point 9 is different for at least three of the groups of points. FIG. 1 shows a first exemplary embodiment of the plunger 1, and FIG. 2 shows a second exemplary embodiment of the plunger 1, seven of the design points 11a to 11g being provided in the first exemplary embodiment, and six of the design points 11a to 11f being provided in the second exemplary embodiment.

The inner contour can be an interpolation of the inner contour points 13. The interpolation can have a spline or a line.

The circle 8 can have a diameter of 1.4 mm to 3.0 mm, for example. Two points arranged on the outer contour 7 can, for example, have a maximum distance of 4.0 mm, in particular 3.5 mm, from each other. It is the condition here that the circle 8 or the closed curve is arranged completely within the outer contour 7.

Figure 3:
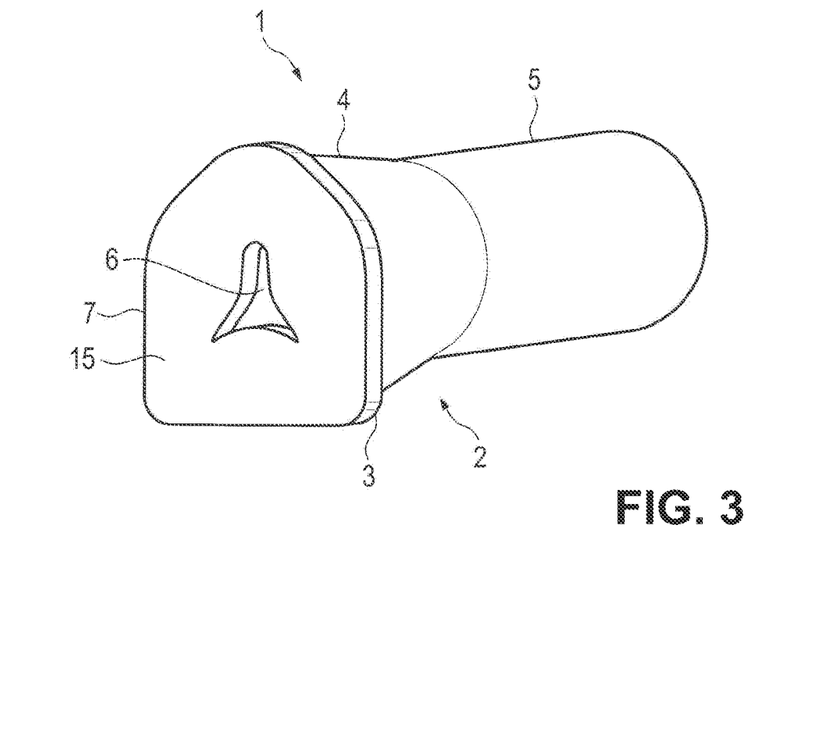
FIG. 3 shows a first perspective view of plunger according to the first exemplary embodiment of the disclosure.
Figure 4:
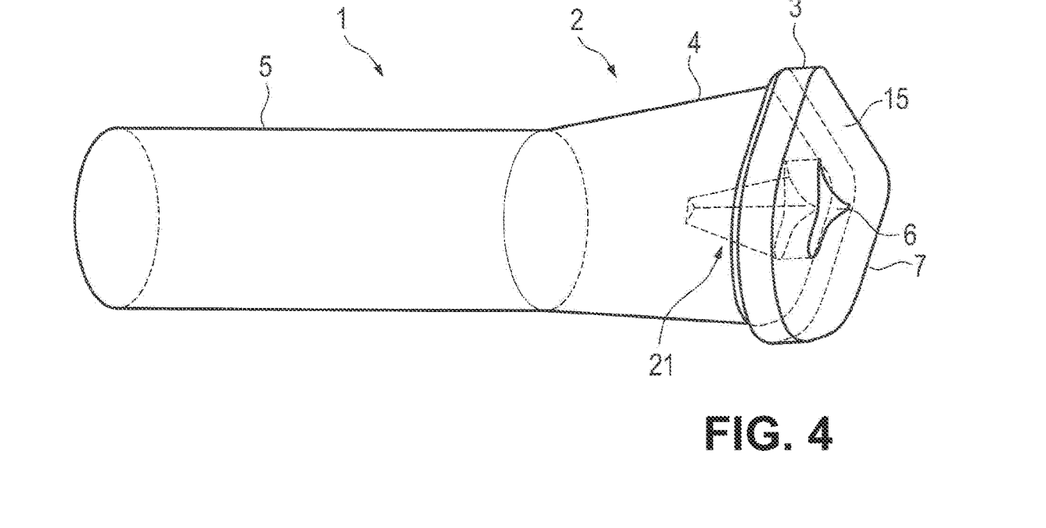
FIG. 4 shows a second perspective view of the plunger according to the first exemplary embodiment of the disclosure.

As can be seen from FIGS. 3 and 4, the cushion 2 can have a widening portion 4 whose longitudinal cross section widens in the direction of the contact surface 15. The recess 6 can extend in the widening portion 4 and taper in the widening portion 4 in a direction away from the contact surface 15 (see reference sign 21). In a plane that is arranged parallel to and at a distance from the contact surface 15 and runs through the recess 6 in the widening portion 4, it can be the case here that, in the unsqueezed state, the cushion 2 has a second outer contour externally delimiting the cushion 2 and a second inner contour externally delimiting the recess 6, wherein an imaginary second reference point is arranged in the recess 6, which reference point is the center point of an imaginary second circle 8 or a second other closed curve arranged in the plane, wherein the plunger 1 has at least two further groups of points, which each have a design point, arranged on the second outer contour, an inner contour point, arranged on the second inner contour, and the second reference point, it being the case for each of the further groups of points that the distance from the design point to the second circle or the second curve is the same length as the distance from the inner contour point to the second reference point, that the design point, the inner contour point and the second reference point lie on a straight line, and that the inner contour point lies between the design point and the second reference point, wherein the distance from the inner contour point to the second reference point is different for at least two of the further groups of points. It will also be seen that the plunger 2 can have a cylindrical portion 5 which adjoins the widening portion 4 at the end thereof facing away from the contact surface 15.

FIGS. 3 and 4 moreover show that the cushion 2 can have a protruding portion 3 which, transverse to a direction parallel to the normal of the contact surface 15, protrudes from the rest of the cushion 2 and forms the contact surface 15. The protruding portion 3 can directly adjoin the widening portion 4.

Figure 5:
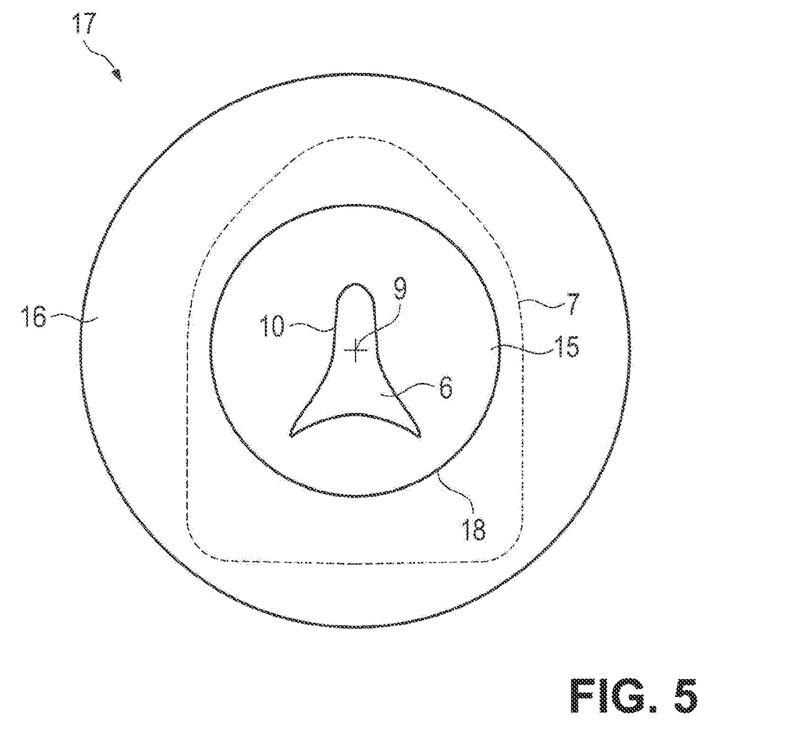
FIG. 5 shows a plan view of an injector.
Figure 6:
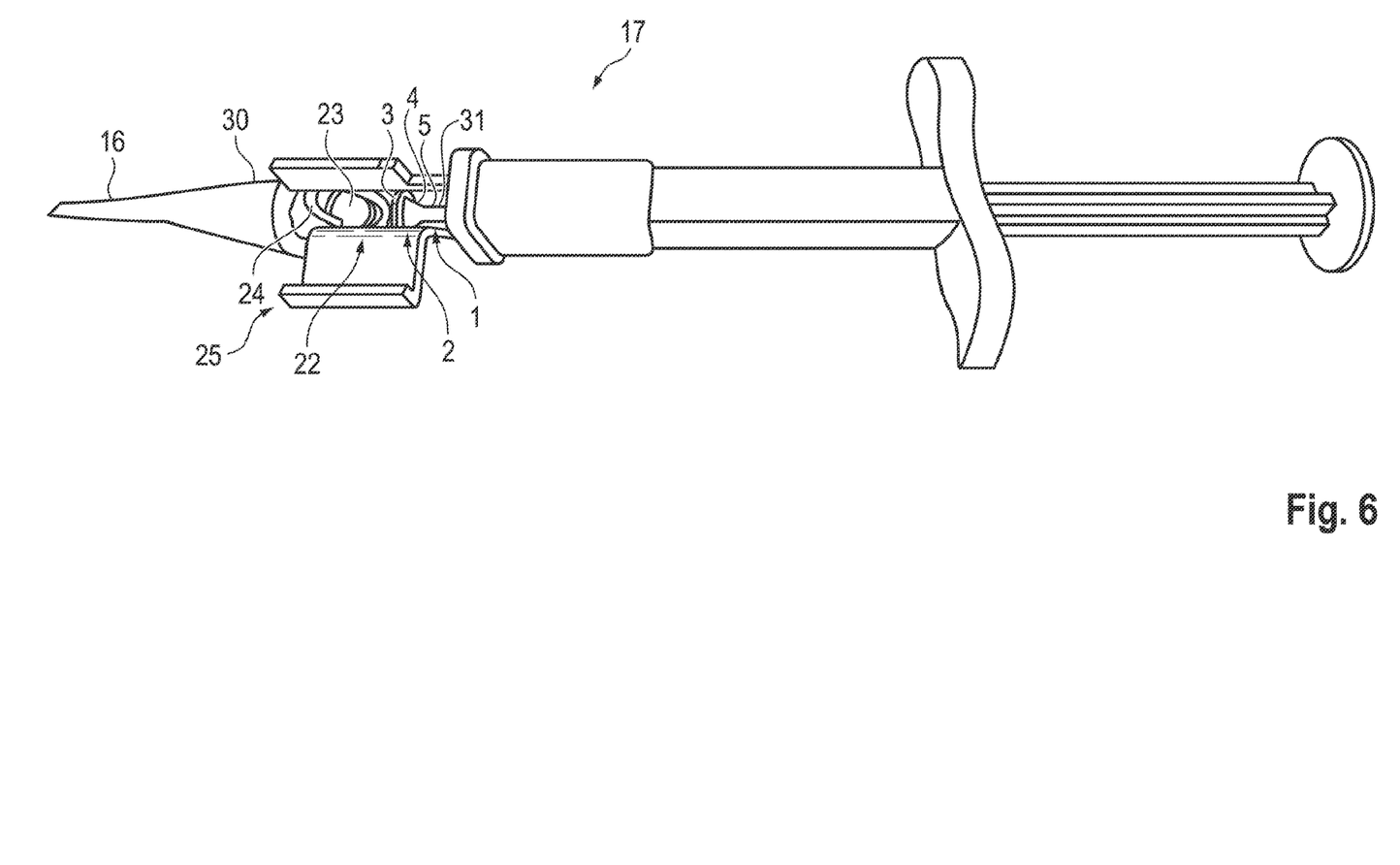
FIG. 6 shows an injector in a schematic side view.

FIGS. 5 and 6 show the injector 17 with the plunger 1 and with a conically tapering tip 16, the plunger 1 being mounted in the injector 17 in such a way as to be displaceable longitudinally in a direction of displacement and being configured to be moved, with the contact surface 15 to the front, into the tip 16. The direction of displacement is perpendicular to the plane of the drawing in FIG. 5 in this case. FIGS. 5 and 6 moreover show that the tip 16 tapers, in the direction of displacement, toward an opening 18 of the tip 16, the intraocular lens 22 being able to be pushed out of the injector 17 by the plunger 1 via the opening 18. It is conceivable that the reference point 9 is chosen such that, when the reference point 9 is projected in the direction of displacement, the reference point 9 coincides with the center of gravity of a first internal cross section of the tip 16, of which the normal is parallel to the direction of displacement. It is also conceivable that the circle 8 has the same diameter as a second internal cross section of the tip 16 at the narrowest point thereof, the normal of the second internal cross section being parallel to the direction of displacement. The narrowest point can lie here at the opening 18, and the first internal cross section and/or the second internal cross section can be the cross section of the opening 18. The first internal cross section and the second internal cross section can coincide and include the opening 18. In the case where the closed curve is provided, the shape of the surface area delimited by the closed curve in its interior can be identical to the second internal cross section. FIG. 6 also shows that the outer contour 7, in its unsqueezed state, can be greater than the second cross section.

It will be seen from FIG. 6 that the intraocular lens 22 can have an optic body 23 and a haptic 24. The intraocular lens 22 is held here in a cartridge 25, which is inserted in an injector body 30. The plunger 1 is attached to one end of a ram 31, which is mounted linearly in the injector body 30.

Before the injector 17 is used, the cushion 2 is in the unsqueezed state. During the use of the injector 17, the plunger 1 is displaced into the tip 16. The contact surface 15 makes contact here with the intraocular lens 22, and the plunger 1 moves the intraocular lens 22 in the direction of the opening 18. In the tip 16, the cushion 2 abuts the wall of the tip 16. Further displacement of the plunger 1 toward the opening 18 squeezes the cushion 2, as a result of which the cushion 2 is brought to a partially squeezed state and the recess 6 becomes smaller. When the contact surface 15 is located in the opening 18, the cushion 2 is in the squeezed state. In the squeezed state, the outer contour of the cushion 2 in the region of the contact surface 15 can have substantially the shape of the circle 8.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 plunger
2 cushion
3 protruding portion
4 widening portion
5 cylindrical portion
6 recess
7 outer contour
8 circle
9 reference point
10 inner contour
11$x$ x-th design point
12$x$ distance of the x-th design point from the circle 8
13$x$ x-th inner contour point
14$x$ distance of the x-th inner contour point from the reference point 9
15 contact surface
16 tip
17 injector
18 opening
19$x$ x-th corner
20$a$ x-th circle
21 tapering of the recess
22 intraocular lens
23 optic body
24 haptic
25 cartridge
30 injector body
31 ram

What is claimed is:

1. An injector, comprising:
   a plunger; and
   a tip,
   wherein the injector is configured to inject an intraocular lens into a capsular bag of an eye,
   wherein the plunger has a deformable cushion which has an unsqueezed state and a squeezed state and, at one longitudinal end of the plunger, the plunger has a contact surface into which a recess is introduced,
   wherein in the unsqueezed state, the contact surface has an outer contour externally delimiting the contact surface and has an inner contour externally delimiting the recess,
   wherein an imaginary reference point is arranged in the recess, which is a center point of an imaginary circle arranged in a plane of the contact surface,
   wherein the plunger has at least two groups of points, which each have a design point, arranged on the outer contour, an inner contour point, arranged on the inner contour, and the reference point, and for each of the groups of points: a distance from the design point to the circle is a same length as a distance from the inner contour point to the reference point, the design point, the inner contour point and the reference point lie on a straight line, and the inner contour point lies between the design point and the reference point,
   wherein the distance from the inner contour point to the reference point is different for at least two of the groups of points,
   wherein the plunger is mounted in the injector such that the plunger is displaceable longitudinally in a direction of displacement and is configured to be moved, with the contact surface to the front, into the tip, and
   wherein the reference point is chosen such that, when the reference point is projected in the direction of displacement, the reference point coincides with the center of gravity of a first internal cross section of the tip, of which a normal is parallel to the direction of displacement.

2. The injector as claimed in claim 1, wherein the plunger has at least three of the groups of points.

3. The injector as claimed in claim 1, wherein the outer contour has a shape different from a circle.

4. The injector as claimed in claim 1, wherein the inner contour is an interpolation of the inner contour points.

5. The injector as claimed in claim 1, wherein the cushion has a widening portion whose cross section widens in the direction of the contact surface.

6. The injector as claimed in claim 5, wherein the recess extends in the widening portion and tapers in the widening portion in a direction away from the contact surface.

7. The injector as claimed in claim 1, wherein the cushion has a protruding portion which, transverse to a direction parallel to the normal of the contact surface, protrudes from the rest of the cushion and forms the contact surface.

8. The injector as claimed in claim 1, wherein the circle has a same diameter as a second internal cross section of the tip at the narrowest point thereof, and
   wherein the normal of the second internal cross section is parallel to the direction of displacement.

9. An injector, comprising:
   a plunger; and
   a tip,
   wherein the injector is configured to inject an intraocular lens into a capsular bag of an eye,
   wherein the plunger has a deformable cushion which has an unsqueezed state and a squeezed state and, at one longitudinal end of the plunger, the plunger has a contact surface into which a recess is introduced,
   wherein in the unsqueezed state the contact surface has an outer contour externally delimiting the contact surface and has an inner contour externally delimiting the recess,
   wherein an imaginary reference point is arranged in the recess, which is a center point of an imaginary closed curve arranged in the plane of the contact surface,
   wherein the plunger has at least two groups of points, which each have a design point, arranged on the outer contour, an inner contour point, arranged on the inner contour, and the reference point, and for each of the groups of points: a distance from the design point to the closed curve is a same length as a distance from the inner contour point to the reference point, the design point, the inner contour point and the reference point lie on a straight line, and that the inner contour point lies between the design point and the reference point, wherein the distance from the inner contour point to the reference point is different for at least two of the groups of points, wherein the plunger is mounted in the injector such that the plunger is displaceable longitudinally in a direction of displacement and is configured to be moved, with the contact surface to the front, into the tip, wherein the closed curve in its interior delimits a surface area which has a same shape as a second internal cross section of the tip at the narrowest point thereof, and wherein a normal of the second internal cross section is parallel to the direction of displacement.

10. The injector as claimed in claim 9, wherein the reference point is chosen such that, when the reference point is projected in the direction of displacement, the reference point coincides with the center of gravity of a first internal cross section of the tip, of which the normal is parallel to the direction of displacement.

* * * * *